(12) United States Patent
Sidebotham et al.

(10) Patent No.: US 12,490,994 B2
(45) Date of Patent: Dec. 9, 2025

(54) SURGICAL CUTTING TOOL

(71) Applicant: LRS Science and Technology, LLC, Mendham, NJ (US)

(72) Inventors: Christopher G. Sidebotham, Mendham, NJ (US); Leon Roitburg, East Hanover, NJ (US); Randall J. Lewis, Bethesda, MD (US)

(73) Assignee: LRS Science and Technology, LLC, Mendham, NJ (US)

( * ) Notice: Subject to any disclaimer, the term of this patent is extended or adjusted under 35 U.S.C. 154(b) by 280 days.

(21) Appl. No.: 18/302,321

(22) Filed: Apr. 18, 2023

(65) Prior Publication Data

US 2023/0255646 A1 Aug. 17, 2023

Related U.S. Application Data

(63) Continuation of application No. PCT/US2021/054438, filed on Oct. 11, 2021.

(60) Provisional application No. 63/093,720, filed on Oct. 19, 2020.

(51) Int. Cl.
*A61B 17/16* (2006.01)
*A61B 17/00* (2006.01)

(52) U.S. Cl.
CPC ........ *A61B 17/164* (2013.01); *A61B 17/1659* (2013.01); *A61B 2017/00526* (2013.01)

(58) Field of Classification Search
CPC .......................... A61B 17/164; A61B 17/1637
See application file for complete search history.

(56) References Cited

U.S. PATENT DOCUMENTS

| | | | |
|---|---|---|---|
| 9,011,443 | B2 | 4/2015 | Whittaker et al. |
| 9,101,368 | B2 | 8/2015 | Sidebotham et al. |
| 2008/0275449 | A1 | 11/2008 | Sackett et al. |
| 2014/0222091 | A1 | 8/2014 | Champagne et al. |
| 2018/0098776 | A1 | 4/2018 | Sidebotham et al. |
| 2020/0222206 | A1 | 7/2020 | Elliot |

FOREIGN PATENT DOCUMENTS

| | | |
|---|---|---|
| CN | 107184247 A | 9/2017 |
| JP | 2015506238 A | 3/2015 |
| JP | 2019510535 A | 4/2019 |
| WO | 2013106848 A1 | 7/2013 |
| WO | 2017136414 A1 | 8/2017 |

OTHER PUBLICATIONS

International Search Report and Written Opinion mailed in International Application No. PCT/US2021/054438 on Mar. 23, 2022, by the European Searching Authority (16 pages).
Notice of Rejection mailed in Japanese Patent Application No. 2023-548173 by the Japanese Patent Office on Apr. 22, 2025, 5 pages (w/English translation of Office Action, 5 pages).

*Primary Examiner* — Andrew Yang
(74) *Attorney, Agent, or Firm* — Klarquist Sparkman, LLP

(57) ABSTRACT

A cutting tool has a first annular member at a proximal end portion of the cutting tool, a second annular member at a distal end portion of the cutting tool, and a plurality of curved side panels extending between the first annular member and the second annular member and coupled to the first and second annular members. The curved side panels are arranged about an axis of rotation of the cutting tool to form a hollow, tubular cutting structure, and include a plurality of cutting teeth oriented in a circumferential direction about the axis of rotation.

22 Claims, 7 Drawing Sheets

FIG. 9A
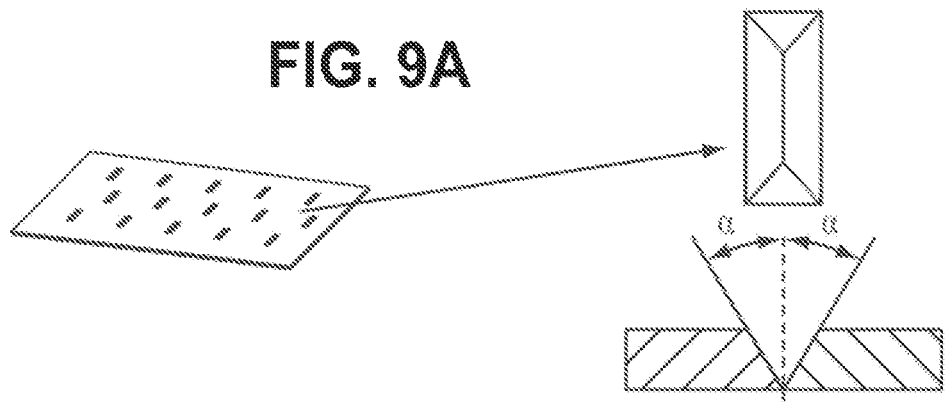
FIG. 9B
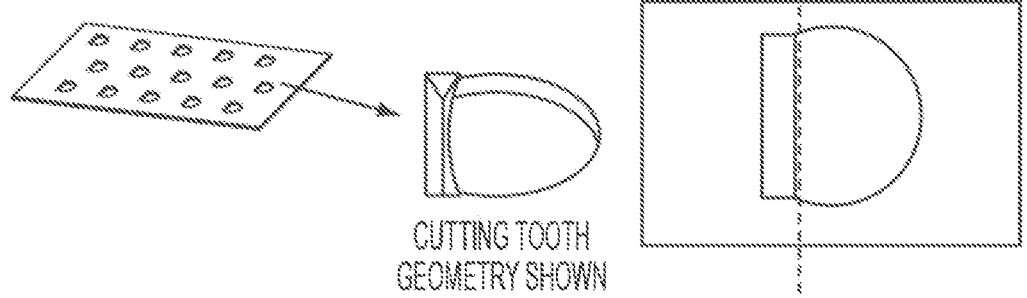
CUTTING TOOTH
GEOMETRY SHOWN
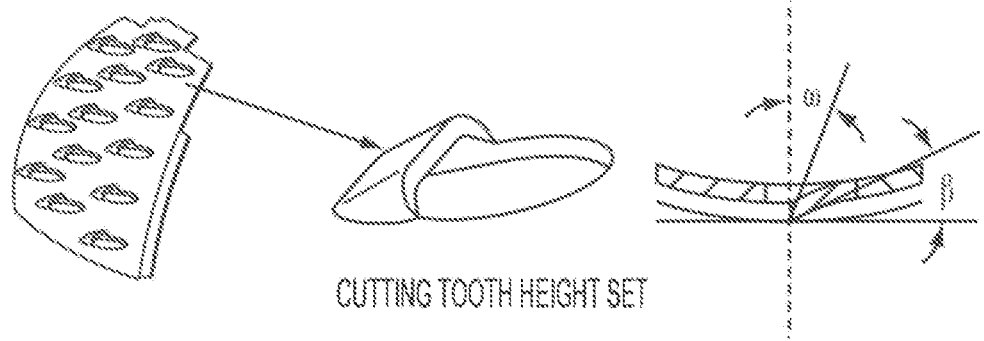
CUTTING TOOTH HEIGHT SET
FIG. 9C

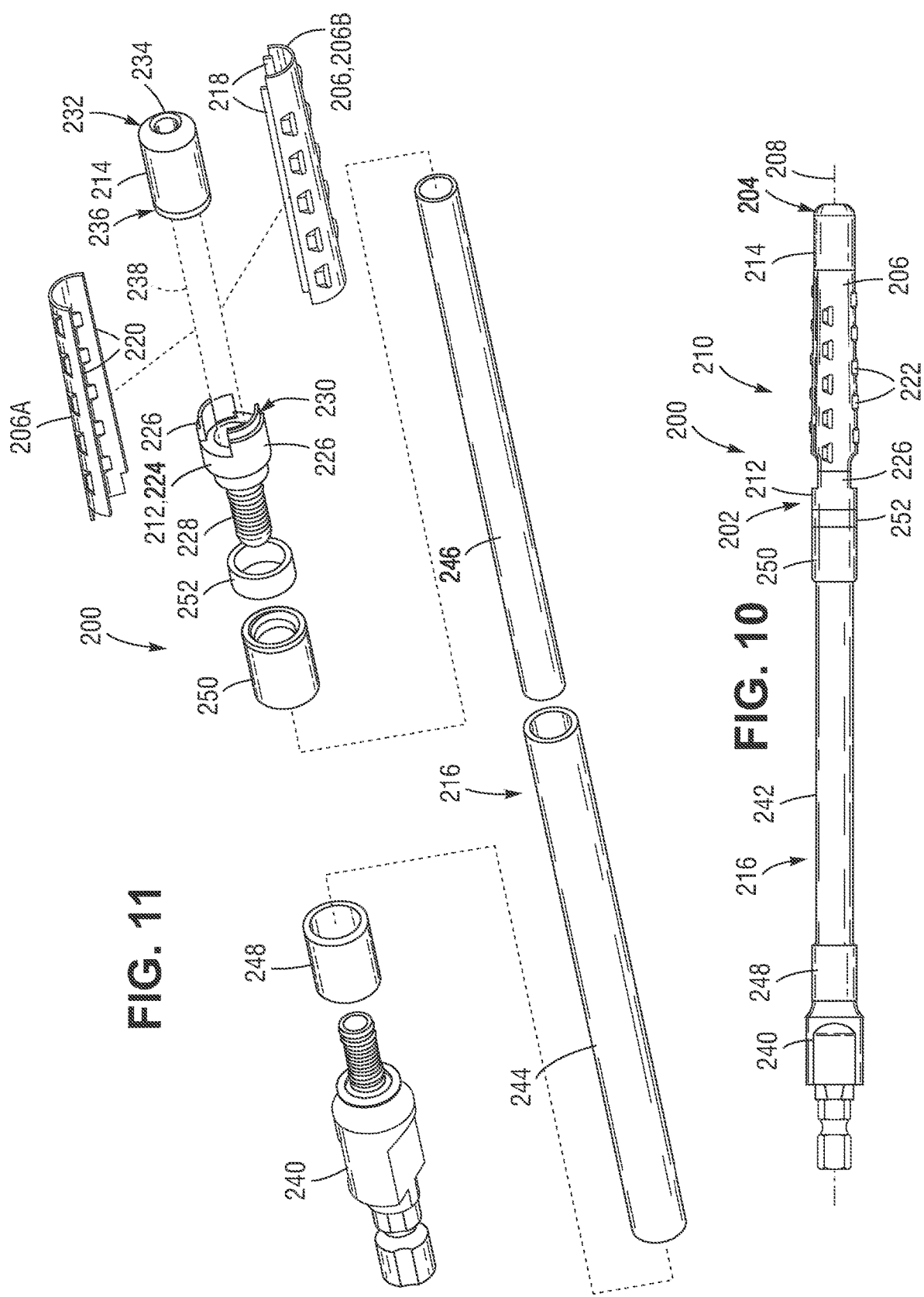

SURGICAL CUTTING TOOL

CROSS REFERENCE TO RELATED APPLICATIONS

This application is a continuation of International Application No. PCT/US2021/054438, filed on Oct. 11, 2021, which application claims the benefit of U.S. Provisional Application No. 63/093,720, filed Oct. 19, 2020. The entire disclosure of each of the above-referenced applications is incorporated herein by reference in its entirety.

FIELD

This disclosure relates to systems and methods relating to orthopedic surgery, and more specifically, surgical cutting tools for preparation of the medullary cavity of long bones.

BACKGROUND

Cutting tools, such as medical reamers used by surgeons, generally have a cutting surface that is able to cut and/or remove material from an object. For example, in many different disciplines in orthopedics cutting tools are used for machining bone in the preparation of artificial joints including hips, knees, elbows and shoulders, and also in the repair of long bone fractures. For example, intramedullary reamers can be used to shape the interior canal/cavity of long bones as part of a fracture repair or prosthesis implantation procedure. The design and method of manufacturing cutting surfaces of such cutting tools can affect the efficiency, functional life of the reamer and cost in manufacturing. Accordingly, there exists a need for improvements relating to design and manufacturing methods of surgical cutting tools.

SUMMARY

Disclosed herein are exemplary embodiments of devices, systems, and related methods for performing orthopedic surgery. In some implementations, the devices and systems can be used to prepare a bone for fracture fixation, and/or for the placement of a prosthetic implant. In some embodiments, the devices and systems can be included in a sterile kit. In some embodiments, some of the devices can be disposable.

In certain embodiments, improved cutting tools and methods of manufacturing the same are provided.

In certain implementations, the cutting tools can comprise medical reamers, including long bone cylindrical reamers and long bone tapered reamers, along with the design of different cutting teeth and the improved method of making these reamers and their cutting edges.

In a representative embodiment, a cutting tool comprises a first annular member at a proximal end portion of the cutting tool, a second annular member at a distal end portion of the cutting tool, and a plurality of curved side panels extending between the first annular member and the second annular member and coupled to the first and second annular members, the curved side panels being arranged about an axis of rotation of the cutting tool to form a hollow, tubular cutting structure and comprising a plurality of cutting teeth oriented in a circumferential direction about the axis of rotation.

In any or all of the disclosed embodiments, the first annular member is a base member configured to be coupled to a shaft.

In any or all of the disclosed embodiments, the second annular member defines an opening into an interior of the cutting tool.

In any or all of the disclosed embodiments, the second annular member comprises a burr member.

In any or all of the disclosed embodiments, the cutting teeth of the curved side panels comprise a long dimension and a short dimension, and the long dimensions of the cutting teeth are oriented longitudinally on a hemispherical surface of the cutting tool.

In any or all of the disclosed embodiments, the plurality of curved side panels are curved metal side panels, and the plurality of curved metal side panels are coupled to each other and to the first and second annular members by welding.

In any or all of the disclosed embodiments, an interior of the cutting structure is completely hollow.

In any or all of the disclosed embodiments, the cutting tool has a constant diameter between the first annular member and the second annular member.

In any or all of the disclosed embodiments, the cutting tool tapers between the first annular member and the second annular member.

In any or all of the disclosed embodiments, the first annular member comprises a plurality of extension portions, the first annular member and the curved side panels are coupled together at junctions, and the extension portions of the first annular member overlap the curved side panels at the junctions.

In any or all of the disclosed embodiments, the extension portions of the first annular member extend within a hollow interior of the cutting tool.

In any or all of the disclosed embodiments, each curved side panel of the plurality of curved side panels comprises a first longitudinal edge portion and a second longitudinal edge portion, and the curved side panels overlap such that the first longitudinal edge portion of each of the curved side panels is disposed on the outside of the cutting structure and the second longitudinal edge portion of each of the curved side panels is disposed on the inside of the cutting structure.

In any or all of the disclosed embodiments, the plurality of curved side panels includes a first curved side panel and a second curved side panel, each of the first and second curved side panels comprises a first longitudinal edge portion and a second longitudinal edge portion, and the first and second longitudinal edge portions of the second curved side panel are received within the the first curved side panel.

In another representative embodiment, a cutting tool comprises a first annular member at a proximal end portion of the cutting tool, a second annular member at a distal end portion of the cutting tool, and a plurality of curved side panels extending between the first annular member and the second annular member and coupled to the first and second annular members, the curved side panels being arranged about an axis of rotation of the cutting tool to form a hollow, tubular cutting structure and comprising a plurality of cutting teeth oriented in a circumferential direction about the axis of rotation, wherein each curved side panel of the plurality of curved side panels comprises a first longitudinal edge portion and a second longitudinal edge portion, and wherein the curved side panels overlap such that the first longitudinal edge portion of each of the curved side panels is disposed on the outside of the cutting structure and the second longitudinal edge portion of each of the curved side panels is disposed on the inside of the cutting structure.

In any or all of the disclosed embodiments, the second annular member comprises a burr member.

In any or all of the disclosed embodiments, the cutting teeth of the curved side panels comprise a long dimension and a short dimension, and the long dimensions of the cutting teeth are oriented longitudinally on a hemispherical surface of the cutting tool.

In any or all of the disclosed embodiments, the plurality of curved side panels are curved metal side panels, and the plurality of curved metal side panels are coupled to each other and to the first and second annular members by welding.

In any or all of the disclosed embodiments, an interior of the cutting structure is completely hollow.

In any or all of the disclosed embodiments, the cutting tool has a constant diameter between the first annular member and the second annular member.

In any or all of the disclosed embodiments, the cutting tool tapers between the first annular member and the second annular member.

In any or all of the disclosed embodiments, the first annular member comprises a plurality of extension portions, the first annular member and the curved side panels are coupled together at junctions, and the extension portions of the first annular member overlap the curved side panels at the junctions.

In any or all of the disclosed embodiments, the extension portions of the first annular member extend within a hollow interior of the cutting tool.

In another representative embodiment, a cutting tool comprises a first annular member at a proximal end portion of the cutting tool, the first annular member comprising a plurality of extension portions extending distally from the first annular member, a second annular member at a distal end portion of the cutting tool, and a plurality of curved side panels extending between the first annular member and the second annular member and coupled to the first and second annular members, the curved side panels being arranged about an axis of rotation of the cutting tool to form a hollow, tubular cutting structure and comprising a plurality of cutting teeth oriented in a circumferential direction about the axis of rotation, wherein the extension portions of the first annular member are received at least partially inside the cutting structure.

In another representative embodiment, a method of making the cutting tool of any of the cutting tool embodiments described herein comprises forming a plurality of cutting teeth in a plurality of panels, curving the panels to form the curved side panels, arranging the curved side panels such that the curved side panels extend between the first annular member and the second annular member, and such that longitudinal edge portions of the curved side panels overlap, and coupling the panels together to form the cutting structure.

In another representative embodiment, a method comprises cutting bone with the cutting tool of any of the cutting tool embodiments described herein.

The foregoing and other objects, features, and advantages of the disclosed technology will become more apparent from the following detailed description, which proceeds with reference to the accompanying figures.

BRIEF DESCRIPTION OF THE DRAWINGS

FIG. 9A illustrates a manufacture of cutting teeth geometry by forming a sheet.

FIG. 9B illustrates cutting tooth geometry of the sheet.

FIG. 9C illustrates a cutting tooth height set.

FIG. 10 is a side view of another embodiment of a hollow, tubular cutting tool.

FIG. 11 is an exploded view of the cutting tool of FIG. 10.

DETAILED DESCRIPTION

Described herein are embodiments of hollow tubular cutting tools for surgical procedures, such as for shaping the medullary cavity/canal of long bones before insertion of an appliance or prosthesis. The hollow tubular cutting tools described herein can comprise a plurality of curved panels assembled/secured together to form a cylindrical, tubular, and/or tapered cutting structure. The panels can comprise a plurality of cutting teeth arranged along the length of the cutting structure and oriented in the circumferential direction. The panels can be coupled at their proximal ends to a first annular member or collar at the proximal end portion of the cutting structure, and at their distal ends to a second annular member or collar forming the distal end of the cutting tool/cutting structure. In certain embodiments, the panels can be stamped metal panels wherein the cutting teeth are formed in one or a series of stamping procedures that form an opening providing access into the interior of the cutting structure, and form the cutting edge (e.g., by extrusion of the material). In certain embodiments, at least the cutting structure can be hollow or substantially hollow to allow bone/tissue fragments to flow freely from the cutting surface into the interior of the tool. In certain embodiments, the circumferential or side edge portions of the panels can be overlapping or interleaved. In certain embodiments, any or all of the first annular member, the panels, and/or the second annular member can be secured together (e.g., by welding). Thus, the hollow tubular cutting tools described herein can provide strength and accurate cutting functionality, and can be economically manufactured. In certain embodiments, this can allow the cutting tools to be economically discarded after a limited number of uses, which can improve patient outcomes by avoiding the use of dull cutting tools, reducing the risk of necrosis due to heat generation, and reducing the risk of surgical site infection.

Example 1: Hollow Tubular Cutting Tool

Figure 1:
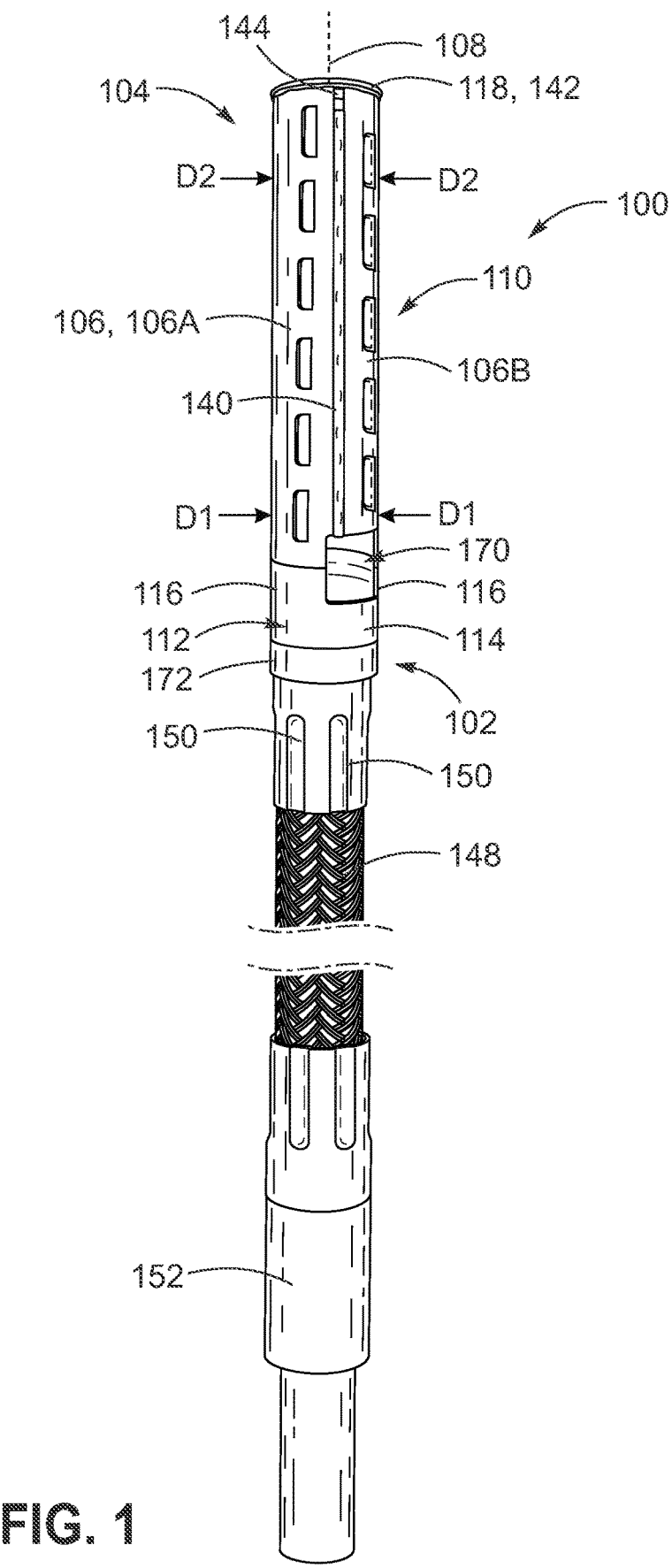
FIG. 1 is a side elevation view of a hollow, tubular cutting tool attached to the distal end of a shaft, according to one embodiment.

FIG. 1 illustrates a cutting tool configured as a hollow tubular cutting tool 100, also referred to as a reamer, according to one embodiment. In certain implementations, the hollow tubular cutting tool can be configured as an intramedullary reamer for shaping/machining/reaming/cutting the canal of long bones such as the medullary cavity/ canal of the femur. In the illustrated embodiment, the cutting tool can have a first or proximal end portion 102 and a second or distal end portion 104. The cutting tool 100 can comprise one or a plurality of curved panel members 106 arranged about a longitudinal axis or axis of rotation 108 of the cutting tool to form a hollow, tubular cutting structure generally indicated at 110. In the illustrated embodiment, the cutting tool 100 can further comprise base member or support member referred to hereinafter as a first annular member 112 disposed at the proximal end portion 102. The first annular member 112 can comprise an annular or ring shaped collar portion 114, and plurality of extension portions 116 (two in the illustrated embodiment) extending from the collar portion 114. The extension portions 116 can be curved about the axis of rotation 108 of the tool, and can be diametrically opposed on opposite sides of the collar portion 114 of the annular member 112. In the illustrated embodiment, the curved panels 106 can be coupled to the first annular member 112 at least at the extension portions 116 (e.g., by welding, fasteners, adhesive, or other coupling means). In certain embodiments, the first annular member 112 can comprise a throughbore, which can allow the cutting tool (and any shaft coupled thereto) to be advanced over a guide member into a bone or other anatomical structure.

Figure 2:
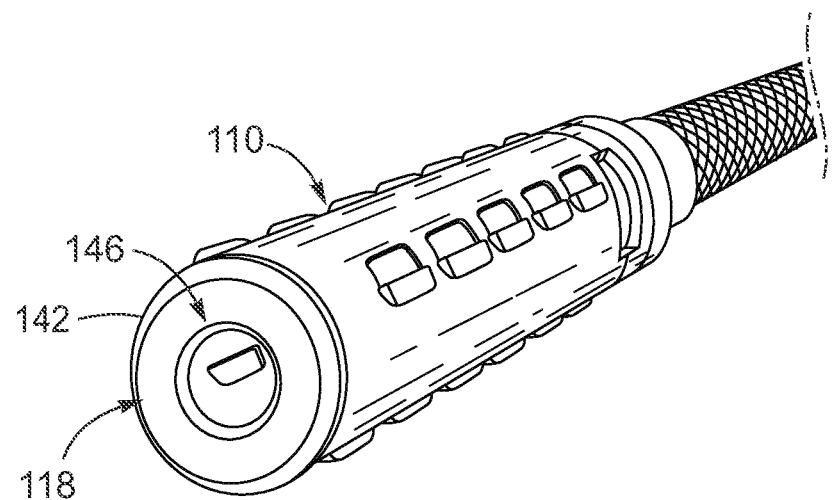
FIG. 2 is a perspective view of the distal end portion of the cutting tool of FIG. 1.

The cutting tool 100 can further comprise a second annular member 118 disposed at the distal end portion 104 and coupled to the curved panels 106. As best illustrated in FIG. 2, in certain embodiments the second annular member 118 can be configured as a cap, end plug member, or guide member comprising a round or circular top member or portion 142 and a tubular cylindrical body 144 (FIG. 1) that extends a relatively short distance into the cylindrical cutting structure 110. In certain embodiments, the top of the second annular member 118 can define an opening 146 (FIG. 2) in communication with the interior of the cutting structure 110. The first annular member 112 and the second annular member 118 can be spaced apart along the longitudinal axis 108 on opposite ends of the cutting structure 110.

Figure 3:
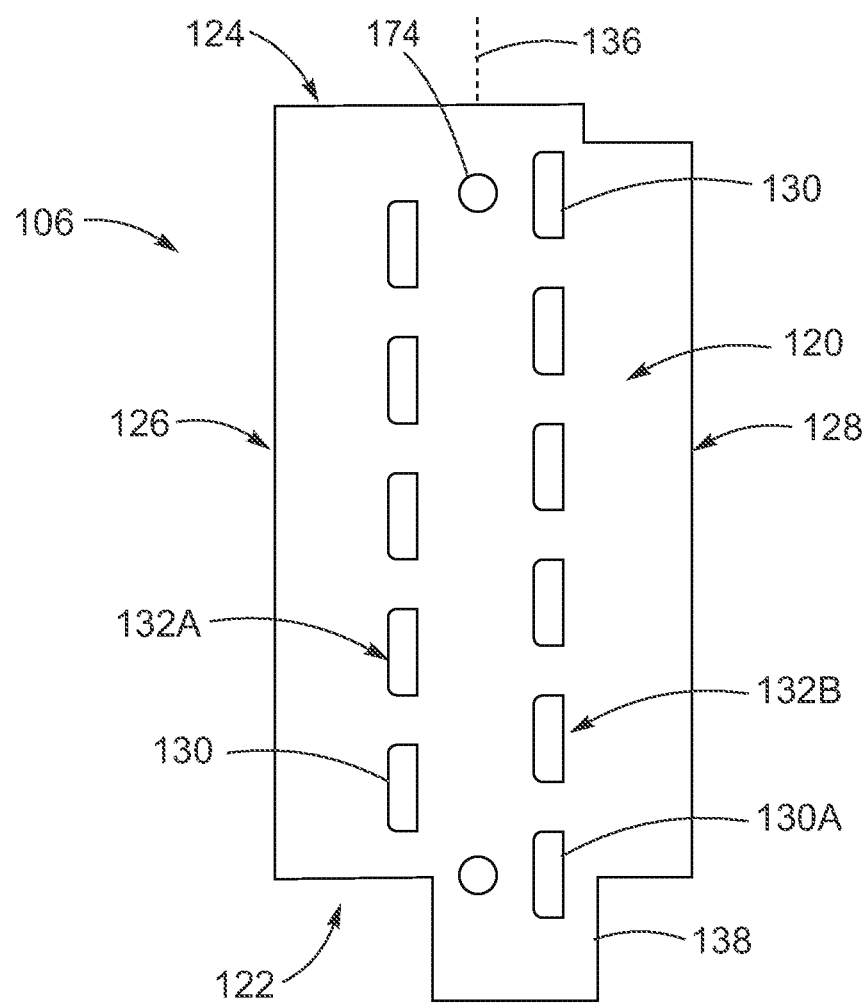
FIG. 3 is a top plan view of a blank for forming a panel member of the cutting tool of FIG. 1.

FIG. 3 illustrates a representative example of a panel member 106 in a laid flat configuration. The panel member 106 can comprise a main body portion 120 having a first end portion 122, a second end portion 124, a first side portion 126 (also referred to as a first longitudinal edge portion), and a second side portion 128 (also referred to as a second longitudinal edge portion). The panel member 106 can further comprises a plurality of cutting teeth 130, which can be arranged in columns. For example, in the illustrated embodiment the panel 106 includes two columns 132A and 132B of cutting teeth 130, although in other embodiments the panel may comprise more or fewer columns of teeth. In the illustrated embodiment, the first column 132A comprises five cutting teeth 130 and the second column 132B comprises six teeth 130, although the number of teeth in each column may vary according to the particular requirements of the cutting tool. The cutting teeth 130 can also be arranged in other arrangements such as rows (e.g., circumferentially extending rows), and need not be arranged in columns.

The cutting teeth 130 of each of the columns can be offset from each other along a longitudinal axis 136 of the panel 106 such that an arc swept by a tooth of one column at least partially overlaps with an arc swept by at least one tooth of the adjacent column. This can avoid the creation of positive ridges/rings of bone or tissue in the anatomical structure to be shaped with the cutting tool. The first end portion 122 can further comprise an extension portion or tab portion 138. A cutting tooth 130A of the second column 132B of cutting teeth can be located at least partially on the tab portion 138.

The cutting teeth 130 can be configured according to any of the cutting tooth embodiments described herein. In the illustrated embodiment, the cutting teeth 130 can comprise a long dimension and a short dimension, and the long dimensions of the cutting teeth can be oriented longitudinally on the surface of the cutting structure 110 (e.g., aligned with the axis of rotation 108).

In certain embodiments, the panel 106 and the cutting teeth 130 can comprise a metal material such as surgical grade stainless steel, titanium or titanium alloys, carbon steel, tungsten carbide, or any other suitable metal material and/or alloy, and can be formed using any of various techniques including stamping, laser cutting, bending, and/or photolithographic procedures further described below. In certain embodiments, a thickness of the panels 106 can be from 0.005 inch to 0.020 inch (0.127 mm to 0.51 mm), such as 0.012 inch (0.31 mm) or less, which can facilitate forming of the cutting teeth (e.g., by stamping) and forming of the panels to a selected curvature, while maintaining strength, reducing heat generated at the cut, and/or improving heat dissipation.

Figure 4:
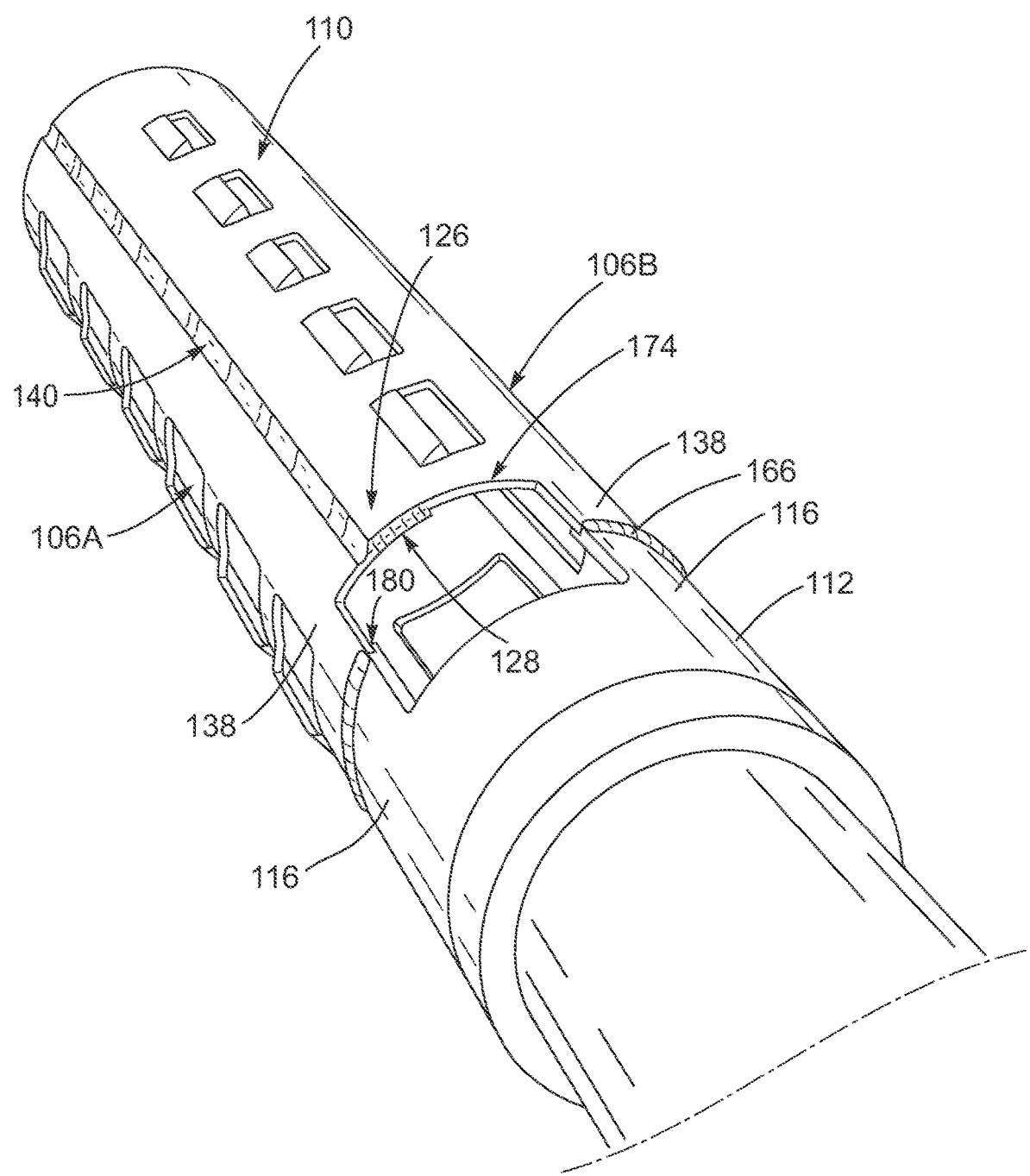
FIG. 4 is a perspective view of the cutting tool of FIG. 1 illustrating a proximal end portion of the cutting tool.

Referring again to FIG. 1, in the illustrated embodiment the cutting tool 100 can comprise two curved panels 106A and 106B coupled together to form the cutting structure 110. For example, in the illustrated embodiment the tab portion 138 of each panel 106 can be coupled to a corresponding extension portion 116 of the first annular member 112. In certain embodiments, the side portions of the curved panel members can overlap and the panels can be secured together along the overlapping side portions. For example, with reference to FIG. 4, in the illustrated embodiment the first side portion 126 of the panel 106B can overlap the second side portion 128 of the panel 106A, and the panels 106A and 106B can be coupled together along the overlapping edge to create a junction or joint 140. A similar joint can be created between the overlapping side portions of the panels on the opposite side of the cutting structure 110, where the second side portion 128 of the panel 106B can extend beneath the first side portion 126 of the panel 106A. Thus, at one junction the panel 106B overlaps the panel 106A, and at the other junction the panel 106A overlaps the panel 106B. In certain embodiments, the first longitudinal edge portion 126 of each panel 106A and 106B is located/disposed on the outside of the cutting structure and the second longitudinal edge portion 128 of each panel 106A and 106B is located/disposed on the inside of the cutting structure. This arrangement can be extended to any number of panels, such as three panels, four panels, etc. In other embodiments, one panel (e.g., panel 106A) can overlap both edge portions of the other panel (e.g., 106B), such that one panel is received within the other at the junctions to form the cutting structure. In yet other embodiments, the longitudinal edge portions can abut each other to form butt joints. One or both of the overlapping longitudinal edge portions can also be thinnned in the manner of a lap joint or a rabbet joint.

In certain embodiments, the panels 106A and 106B can be coupled together by welding along the joints such as the joint 140 (e.g., by laser welding). The panels 106A and 106B can also be welded to the first annular member 112 and/or to the second annular member 118 along the respective edges/margins/edge portions of contact. In embodiments including more than two panels 106, the first annular member 112 can comprise a corresponding number of extension portions 116. In certain embodiments, the first annular member 112 and the second annular member 118 can comprise a metal material to facilitate welding to the panel members.

In certain embodiments, the interior of the cutting structure 110 can be completely hollow. As used herein, the term "completely hollow" means that the interior of the cutting structure 110 is free of internal supports, frames, etc., between the first annular member 112 and the second annular member 118. Hollow cutting tools without internal frame structures as described herein can provide a number of advantages. For example, as tissue/bone is cut by the cutting tool, it travels through the openings in the cutting structure into the interior of the cutting structure. As tissue/bone material collects inside the cutting structure, it can become packed and can eventually reach the outer surface of the cutting structure. This can cause additional friction, potentially leading to necrosis, and/or can reduce the cutting efficiency of the tool as cut tissue/bone fragments no longer flow into the body of the cutting structure but instead remain between the surface of the cutting tool and the anatomical surface to be cut. The hollow tubular reamer embodiments described herein provide additional space within the cutting structure body for collecting tissue/bone fragments due to the lack of an internal frame, without increasing the outer diameter of the cutting tool and while preserving the structural integrity/strength of the cutting tool. This can be especially advantageous for relatively small hollow tubular reamers having diameters of, for example, 12 mm or less, such as 9 mm or less. The improved cutting efficiency of the tool can also reduce the time and/or the number of revolutions of the cutting tool needed to achieve the desired shaping of the anatomical structure which, in turn, can reduce procedure time and undesirable heat generation at the surgical site.

Referring again to FIG. 1, the first annular member 112 can be coupled to a shaft 148. In certain embodiments, the first annular member 112 can be coupled to the shaft 148 by a coupling member 150 crimped onto the distal end portion of the shaft, or by other coupling means. In the illustrated embodiment, the shaft 148 is configured as a flexible braided metal shaft, although the shaft may be configured as any kind of flexible shaft or non-flexible shaft, other types of shafts, or combinations thereof. For example, the hollow tubular cutting tool embodiments described herein can also be used with shafts comprising relatively thin metal walls, such as stainless steel or nitinol, which can also be flexible. In certain embodiments, the shafts such as the shaft 148 can be hollow tubular shafts, and can comprise a lumen in fluid communication with the interior of the cutting structure 110. This can allow for, for example, liquid or fluid flow through the shaft and into the hollow interior of the cutting structure, such as lubricant or cutting fluid, vacuum, etc. Hollow tubular shafts can also allow the cutting tool and associated shaft to be advanced over a guide wire or other guide member into an anatomical structure, such as into the intramedullary canal.

In the illustrated embodiment, the shaft 148 can comprise a coupling member 152 at the proximal end of the shaft, which can be configured for coupling to a driver (e.g., a drill) to rotate the shaft and the cutting tool. Examples of flexible braided shafts that can be used in combination with the hollow tubular cutting tools described herein are discussed in U.S. Pat. No. 8,518,044, which is incorporated herein by reference. In other embodiments, the cutting tool 100 can be coupled to a rigid or substantially rigid shaft, such as a rod or tube comprising, for example, any of a variety of metal alloys such as stainless steel, nickel-titanium alloys such as Nitinol, etc., polymeric materials such as any of various medical grade plastics, or composite materials such as fiber-reinforced polymer materials. Such rigid or substantially rigid shafts can be used to keep guided reaming centralized during, for example, revision surgery or fracture fixation. Examples of such shafts are described in U.S. Pat. No. 8,540,716, which is incorporated herein by reference. In certain embodiments, the hollow tubular cutting tool embodiments described herein can be permanently attached/secured to a shaft, or can be removably coupled to a shaft by a releasable coupling mechanism/coupler.

In the illustrated embodiment, the cutting tool 100 and/or the cutting structure 110 can have a constant or substantially constant diameter along its length. In other embodiments, the diameter of the cutting tool 100 can vary along its length. For example, in certain embodiments the cutting tool 100 and/or the cutting structure 110 can be tapered, and can have a first diameter D1 (FIG. 1) at the proximal end portion 102 and a second diameter D2 at the distal end portion 104 that is less than the first diameter. In certain embodiments, the first diameter D1 can be from 3 mm to 12 mm, 5 mm to 10 mm, 7 mm to 9 mm, 8 mm to 10 mm, 12 mm or less, 11 mm or less, 10 mm or less, etc. In certain embodiments, the second diameter D2 can be from 1 mm to 10 mm, 3 mm to 10 mm, 5 mm to 10 mm, 7 mm to 9 mm, 10 mm or less, 9 mm or less, 8 mm or less, 7 mm or less, etc. In one particular embodiment, the first diameter D1 can be 10 mm and the second diameter D2 can be 9 mm. In another particular embodiment, the first diameter D1 can be 9 mm and the second diameter D2 can be 7 mm. The diameters and the degree of tapering can depend on the size of the cutting tool and the particular procedure to be performed. In certain embodiments, the diameter reduction in the distal direction can be constant, or can vary along the length of the cutting tool.

In certain embodiments, the shape of the panels 106A and 106B and the manner of coupling of the panels to the extension portions 116 of the first annular member 112 can define one or more openings 170 between the main body of the annular member 112 and the main body of the cutting structure 110. In the illustrated embodiment, the cutting tool has two openings 170 having a rectangular shape and/or angled corners, but in other embodiments the cutting tool can have any number of openings having any shape. In certain embodiments, the openings 170 can facilitate flow of material (e.g., bone fragments, fluid, etc.) through the hollow interior of the cutting structure and out of the base of the cutting structure.

Figure 5:
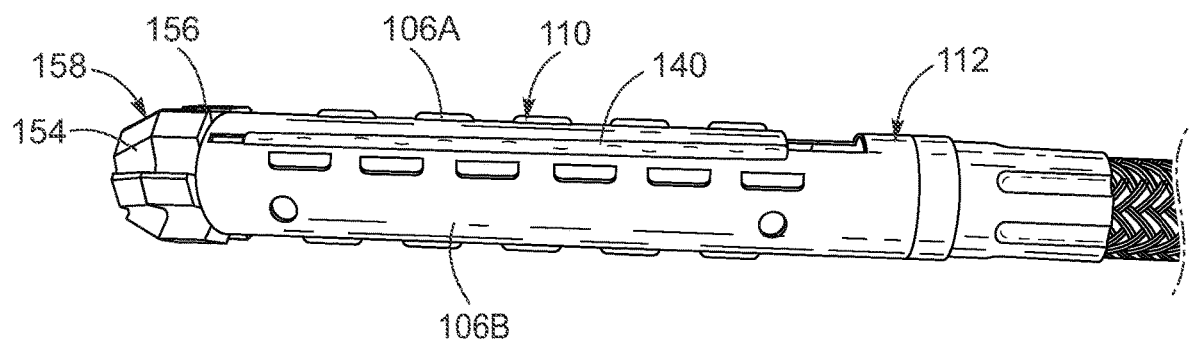
FIGS. 5-7 are perspective views of another embodiment of a hollow, tubular cutting tool including a burr at the distal end portion.
Figure 6:
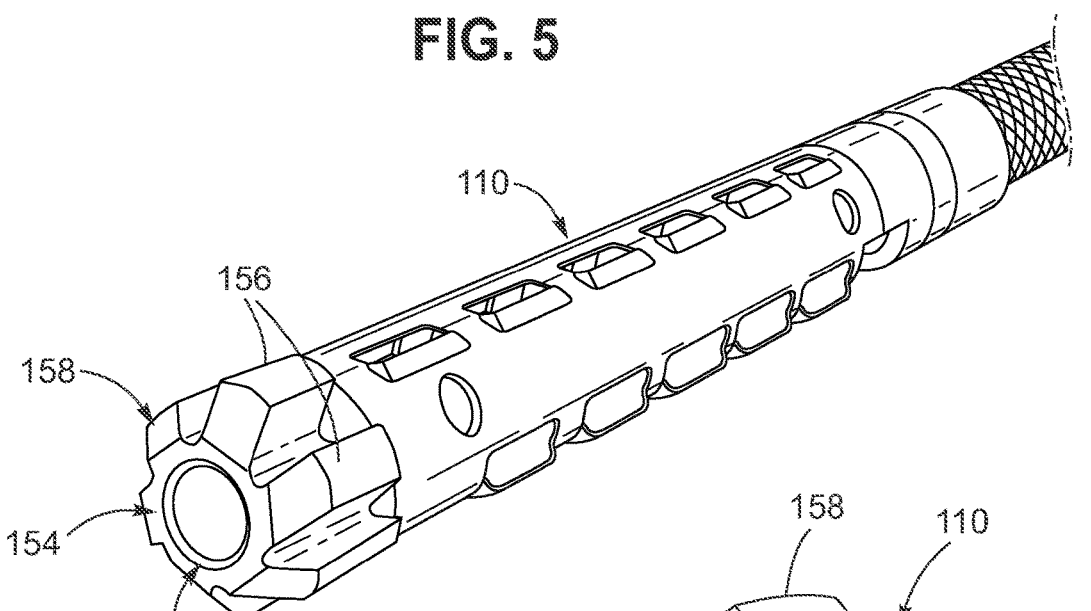
Figure 7:
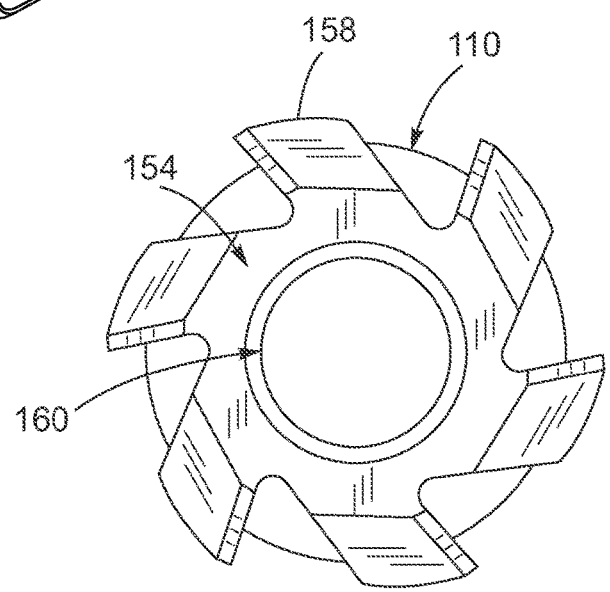

In certain embodiments, the second annular member 118 can comprise, and/or be configured as, a second cutting structure or reamer portion/member. For example, FIGS. 5-7 illustrate another embodiment of the hollow tubular cutting tool 100 where the second annular member 118 is configured as a reamer, rasp, burr, or cutter member 154. In the illustrated embodiment, the cutter member 154 is configured as a cylindrical member comprising a plurality of cutting teeth 156 arranged circumferentially around the cutter member, and comprises a chamfered distal end portion 158 to provide a cone/cylinder geometry. This can allow the reamer to enter a relatively small diameter hole (e.g., previously prepared in the bone), and enlarge the hole to a diameter sufficient for the main body of the cutting structure 110 to enter. The main body of the cutting tool 100 can then further enlarge the hole to a specified diameter for the procedure being performed. With reference to FIGS. 6 and 7, in certain embodiments the cutter member 154 can be hollow, and can define an opening 160 in the distal end portion 158 that is in communication with the interior of the hollow cutting structure 110 (e.g., to facilitate passage of the tool over a guide wire), although in other embodiments the cutter member can be a solid member that forms a closed end portion of the cutting structure 110.

In certain embodiments, the cutter member 154 can be made from high-strength materials such as carbon steel, tungsten carbide, stainless steel, titanium or titanium alloys, etc. The cutter member 154 can also have any shape, such as a cone shape, an ovoid shape, a spherical shape, etc. In certain embodiments, the cutter member 154 can have the same or substantially the same diameter as at least the distal end portion of the cutting structure 110, although in other embodiments the cutter member can have a larger diameter or a smaller diameter than the distal end portion of the cutting structure 110 depending upon the particular procedure to be performed.

In a representative method, the hollow tubular cutting tool 100 can be manufactured by stamping or cutting one or more panels 106, forming the cutting teeth 130 and other openings/features in the panels, and forming the panels into a curved shape (e.g., using a mandrel). For example, in certain embodiments the cutting tooth configurations can lend themselves to manufacture by stamping, and can advantageously create an opening to allow bone debris to flow into the body of the cutting tool during cutting. For example, in certain embodiments openings of the cutting teeth can be stamped or punched in a first step, and the edge intended to form the cutting edge of each tooth can be upset or uplifted in a second stamping step that does not punch or extend through the panel. In certain embodiments, the cutting edge can also be simultaneously pressed/compressed during the uplifting step. This can stamp/compress/extrude the material, thereby reducing its thickness to form a sharp cutting edge. For example, in a representative embodiment the material thickness prior to the edge formation stamping step can be 0.012 inch (0.31 mm), and the resulting edge after stamping can have a thickness of 0.003 inch (0.075 mm), yielding a sharp cutting edge.

The flat panels can then be curved to a specified curvature by, for example, stamping/pressing the panels with/through a series of dies which progressively bend the panels to a specified panel contour. In certain embodiments, such bending can be done in a series of steps to avoid abrupt changes in geometry, which can result in cracks in the panel material. In other embodiments, the panels 106 can be laser cut, milled, punched, etched (e.g., as part of a lithography process) etc., from metal sheet stock, and the various cutting teeth, openings, etc., can be formed according to any of the methods described herein.

In the illustrated embodiment, the panels 106 can also include one or a plurality of round openings 174 (FIG. 3) defined in the main body. In certain embodiments, the openings 174 can function as datum holes/openings to facilitate accurate positioning of the panels during the stamping process.

The curved side panels 106 can then be assembled on the shaft by coupling the tab portions 138 of the panels and the extension portions 116 of the annular member 112 together at junctions 166 (FIG. 4) configured as lap joints or rabbet joints, although other joint configurations are possible. In certain embodiments, the tab portions 138 of the panels 106 can overlap the extension portions 116 to form the junctions 166, and such that end portions of the extension portions 116 are disposed in the interior of the cutting tool and the tab portions 138 of the panels 106 are on the radially outward surface of the cutting tool. In certain embodiments, the extension portions 116 can define slots and/or reduced thickness portions 180 (e.g., with shoulders or ledges) at their free ends configured to receive the tab portions 138. In yet other embodiments, the tab portions 138 can be located in the interior of the tool. The panels 106 can then be secured together by, for example, welding at the overlapping side portions to form the joints 140. The panels 106 can also be welded to the extension portions 116 at the junctions 166, and the second annular member 118 can be inserted into the distal end portion of the cutting structure 110 and welded or secured in place.

In other embodiments, the cutting structure 110 can be formed by a single panel 106 configured to extend around the entire circumference of the hollow tubular cutting tool. Such a panel can be formed from tube stock (e.g., by laser cutting), and/or from flat sheet stock and curved to the appropriate shape and attached at a junction (e.g., by welding) to form the cutting structure.

Referring again to FIG. 1, in certain embodiments the cutting tool can comprise an annular indicator member 172 be disposed between the collar member 150 and the collar portion 114 of the first annular member 112 (e.g., around a shank member of the first annular member as shown in FIG. 11). In certain embodiments, the indicator member 172 can include indicia, such as color or markings indicative of a size (e.g., length, diameter, etc.), type, and/or other features of the cutting tool 100.

Example 2: Cutting Teeth

In certain embodiments, the panels 106 of the cutting structure 110 can comprise cutting teeth having a plurality of different shapes/designs. The number, size, and/or location of the cutting teeth on the panels can also be varied according to the specific cutting properties sought.

Figure 8B:
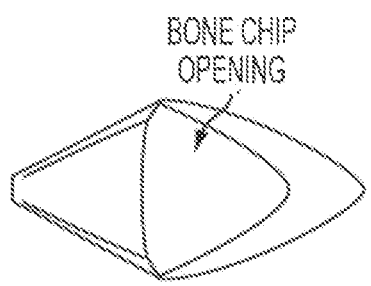
FIG. 8B illustrates a bone chip opening.
Figure 8C:
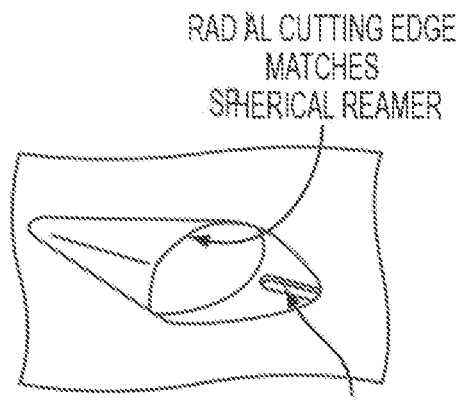
FIG. 8C illustrates a funnel angle for bone debris.
Figure 8A:
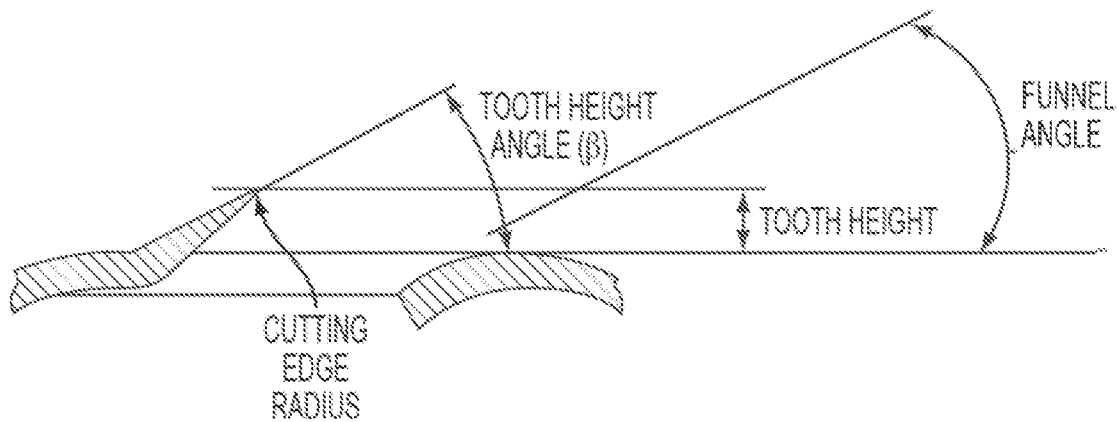
FIG. 8A illustrates a portion of a cutting tool comprising a sharp tooth edge, a specific tooth elevation, specific cutting angle, a specific tooth orientation to the axis of rotation and a peripheral opening around the cutting edge providing an improved flow path for the bone debris.

FIGS. 8A-8B illustrate another exemplary configuration of a cutting tooth that can be used in combination with the hollow tubular cutting tool embodiments described herein. In certain embodiments, cutting surfaces (e.g., teeth) can comprise a sharp tooth edge (e.g., tolerance 0.0005" to 0.002" (0.0127 mm to 0.051 mm) tooth edge radius), a tooth elevation (e.g., tolerance 0.002"-0.004" (0.051 mm to 0.012 mm), a cutting angle, a tooth orientation to the axis of rotation (e.g., tool angle), and/or a peripheral opening around the cutting edge providing a designed flow path for the bone debris as shown in FIGS. 8A-8C. This tooth geometry can also be manufactured according to FIGS. 9A-9C through a series of stamping operations allowing for multiple teeth to be made at the same time. For example, as illustrated in FIG. 9A, a flat sheet of material (e.g., metal) can be stamped so that a plurality of "V"-type cavities are punched into the sheet based on a desired cutting angle co. Next, a plurality of holes can be punched around the "V"-type cavities (or grooves), creating a cutting edge. If necessary, another stamping step can be performed to stamp the tooth height and curvature in operation (or multiple operations if desired). As shown in FIG. 9C, angle $\beta$ determines the tooth height and angle $\beta$ in conjunction with angle $\alpha$ can determine the rake angle $\omega$ ($\omega=\alpha-\beta$) of the cutting surface. In some embodiments, the rake angle can vary between about 5 and 25 degrees, and in other embodiments between about 5 and 15 degrees (e.g., about 10 degrees).

Thus, in certain embodiments the tooth angle ($\alpha$) can be established in the first forming operation and can be set ($\omega$ and $\beta$ angles) based on the intended function. In certain embodiments, multiple iterations of this tooth design can be provided in specific zones of the cutting structure surface, which address the intended type of cutting required at those locations.

As noted above, proper bone chip exit paths can also contribute to an improved surgical preparation. With a non-impeded path for the bone chips to travel away from the cutting surface, it enables the instrument to produce a faster and cooler bone cut. As shown in FIGS. 8A-8C, openings can be provided adjacent cutting surfaces (e.g., in front of the cutting surfaces in the direction of rotation) to provide a "funnel" that permits bone chips to efficiently flow from the outer surface of the cutting tool to avoid additional torque requirements to drive the cutter. Without such openings, increased torque can be required to drive the cutting tool and such increased torque is usually accompanied by increased axial pressure as the operator senses the resistance in advancing the cutter and applies increased loads. This combination can generate increased heat through friction capable of generating temperatures which can cause bone necrosis.

As noted above, in certain embodiments the hollow tubular cutting tools described herein can be manufactured by forming the panels and teeth from relatively thin sheet metal, (e.g., 0.005 inch to 0.020 inch (0.127 mm to 0.51 mm)), which can improve the efficiency in manufacturing (longer tool life of the forming tools) and ability to create a sharp tooth edge without a specific sharpening operation. In addition, the thinner material better dissipates the heat generated from the friction of cutting the bone over a thicker walled, heavier mass reamers. The thinner material can also produce less friction, and therefore a lower temperature at the cutting surface, which can help to avoid bone necrosis.

Example 3: Additional Embodiments of Hollow Tubular Cutting Tools

FIGS. 10 and 11 illustrate another example of a hollow tubular cutting tool 200 (also referred to as a reamer). The cutting tool 200 can have a first or proximal end portion 202, a second or distal end portion 204, and a plurality of curved panel members 206 arranged about a longitudinal axis 208 to form a cutting structure 210. The cutting tool 200 can further comprise a first annular member 212 coupled to the cutting structure 210 at the proximal end portion 202, and a second annular member configured as a guide member 214 coupled at the distal end portion 204. The cutting tool 200 can be coupled to a shaft assembly generally indicated at 216.

FIG. 11 illustrates an exploded view of the cutting tool 200 and the shaft assembly 216. The cutting structure 210 can comprise a first curved panel 206A and a second curved panel 206B. The second panel 206B can comprise longitudinal edge portions 218 that are inwardly offset from the outer surface of the second panel 206B and configured to be received within the corresponding longitudinal edge portions 220 of the first panel 206A when the panels are assembled together. Thus, the longitudinal edge portions 220 of the first panel 206A overlap the longitudinal edge portions 218 of the second panel 206B to form junctions in which the longitudinal edge portions 218 are inside the cutting structure 210. In certain embodiments, the junctions between the curved panels 206A and 206B can be secured together by welding, similar to the junctions 140 of the cutting tool 100 of FIG. 1. The first and second panels 206A and 206B can comprise a plurality of cutting teeth 222 arranged in longitudinally aligned columns, similar to the cutting tool 100. In certain embodiments, a cylindrical and/or tubular member 238 can be disposed within the cutting structure 210 and can extend between the first annular member 212 and the guide member 214. In certain embodiments, the tubular member 238 can be omitted and the cutting structure 210 can be completely hollow.

The first annular member 212 can be configured similar to the first annular member 112 of FIG. 1, and can include a collar portion 224, a plurality of curved extension members or portions 226 (two in the illustrated embodiment) extending from the collar portion 224, and a cylindrical shank member 228 extending proximally from the collar portion 224 on the opposite side the collar portion from the extension members 226. In certain embodiments, the shank member 228 can be threaded. In certain embodiments, the shank member 228 can have a surface finish suitable for retaining the bushing 250 after the bushing is crimped. The curved panels 206A and 206B can be coupled to the first annular member 212 at least at the extension portions 226. The end portions 230 of the extension portions 226 can have a shoulder or ledge and a reduced thickness to receive the edge portions of the curved panels 206A, 206B at joints as described above. In certain embodiments, the circumferential length of the extension portions 226 and/or the end portions 230 can be the same as the circumferential length of the tab portions (e.g., tab portion 138) of the panel members 206, or may be larger or smaller.

The guide member 214 can comprise a tubular, cylindrical body with a rounded distal end portion 232 defining an opening 234. A reduced diameter proximal portion 236 can be received within the cutting structure 210 and can be secured to the curved side panels 206A, 206B (e.g., by welding). The guide member 214 can provide structural support to the distal end of the cutting structure 210, and can also accommodate a guide wire extending through the tool. In certain embodiments, the guide member 214 can comprise a burr or other cutter similar to the cutter member 154.

The shaft assembly 216 can comprise a proximal coupling member 240 configured for attachment to a driver to rotate the cutting tool, and a shaft 242 extending between the coupling member 240 and the first annular member 212. The cylindrical distal portion of the coupling member 240 can be threaded, or can have another suitable surface finish. The shaft 242 can comprise a tubular outer sleeve member 244 and a tubular member 246 disposed coaxially within the outer sleeve 244. Bushings (e.g., crimpable bushing) 248 and 250 can be disposed at both ends of the shaft 242. In the illustrated embodiment, an annular indicator member 252 can be disposed around the shank member 228 of the first annular member 212 between the bushing 250 and the collar portion 224 of the first annular member. In certain embodiments, the indicator member 252 can include indicia, such as color or markings indicative of a size (e.g., length, diameter, etc.), type, and/or other features of the cutting tool 200.

Any of the components of the cutting tool 100 and the cutting tool 200, such as the annular members, the shaft assemblies, etc., can be used in combination with any of the other cutting tool embodiments described herein. In certain embodiments, any of the cutting tool embodiments described herein can be packaged together with any of the shaft assembly embodiments described herein in a sterile kit or surgical pack.

General Considerations

The above description is exemplary in nature and is not intended to limit the scope, applicability, or configuration of the disclosed technology in any way. Various changes to the described embodiments may be made in the function and arrangement of the elements described herein without departing from the scope of the disclosure.

Although the operations of some of the disclosed embodiments are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art when viewed in light of this disclosure.

As used herein, the term "proximal" refers to a position, direction, or portion of a device that is closer to the user and further away from the implantation/surgical site. As used herein, the term "distal" refers to a position, direction, or portion of a device that is further away from the user and closer to the implantation/surgical site. Thus, for example, proximal motion of a device is motion of the device away from the implantation/surgical site and toward the user (e.g., out of the patient's body), while distal motion of the device is motion of the device away from the user and toward the implantation/surgical site (e.g., into the patient's body). The terms "longitudinal" and "axial" refer to an axis extending in the proximal and distal directions, unless otherwise expressly defined.

As used herein, the term "approximately" and "about" means the listed value and any value that is within 10% of the listed value. For example, "about 10 mm" means any value between 9-11 mm, inclusive.

As used in this application and in the claims, the terms "a," "an," and "the" include both the singular and plural forms of the element(s) they refer to unless the context clearly dictates otherwise. Additionally, the term "includes" means "comprises." Further, the term "coupled" generally means electrically, electromagnetically, and/or physically (e.g., mechanically or chemically) coupled or linked and does not exclude the presence of intermediate elements between the coupled or associated items absent specific contrary language.

Directions and other relative references may be used herein to facilitate discussion of the drawings and principles described herein. For example, certain terms may be used such as "up," "down,", "left," "right," "horizontal," "vertical," and the like. Such terms are used, where applicable, to provide some clarity of description when dealing with relative relationships, particularly with respect to the illustrated embodiments. Such terms are not, however, intended to imply absolute relationships, positions, and/or orientations. As used herein, "and/or" means "and" or "or", as well as "and" and "or".

In view of the many possible embodiments to which the principles of the disclosure may be applied, it should be recognized that the illustrated embodiments are only examples and should not be taken as limiting the scope of the claimed subject matter. Rather, the scope of the claimed subject matter is at least as broad as the following claims and their equivalents.

The invention claimed is:

1. A cutting tool, comprising:
   a first annular member at a proximal end portion of the cutting tool;
   a second annular member at a distal end portion of the cutting tool; and
   a plurality of curved side panels extending between the first annular member and the second annular member and coupled to the first and second annular members, the curved side panels being arranged about an axis of rotation of the cutting tool to form a hollow, tubular cutting structure and comprising a plurality of cutting teeth oriented in a circumferential direction about the axis of rotation;
   wherein the second annular member defines an opening in a distal end portion of the second annular member that is in communication with an interior of the tubular cutting structure; and
   the plurality of curved side panels includes a first curved side panel and a second curved side panel, each of the first and second curved side panels comprises a first longitudinal edge portion and a second longitudinal edge portion, and the first and second longitudinal edge portions of the second curved side panel are received within the first curved side panel.

2. The cutting tool of claim 1, wherein the first annular member is a base member configured to be coupled to a shaft.

3. The cutting tool of claim 1, wherein the second annular member comprises a burr member.

4. The cutting tool of claim 3, wherein:
   the cutting teeth of the curved side panels comprise a long dimension and a short dimension; and
   the long dimensions of the cutting teeth are oriented longitudinally on a hemispherical surface of the cutting tool.

5. The cutting tool of claim 1, wherein:
   the plurality of curved side panels are curved metal side panels; and
   the plurality of curved metal side panels are coupled to each other and to the first and second annular members by welding.

6. The cutting tool of claim 1, wherein an interior of the cutting structure is completely hollow.

7. The cutting tool of claim 1, wherein the cutting tool has a constant diameter between the first annular member and the second annular member.

8. The cutting tool of claim 1, wherein the cutting tool tapers between the first annular member and the second annular member.

9. The cutting tool of claim 1, wherein:
   the first annular member comprises a plurality of extension portions;
   the first annular member and the curved side panels are coupled together at junctions; and
   the extension portions of the first annular member overlap the curved side panels at the junctions.

10. The cutting tool of claim 9, wherein the extension portions of the first annular member extend within a hollow interior of the cutting tool.

11. A cutting tool, comprising:
    a first annular member at a proximal end portion of the cutting tool;
    a second annular member at a distal end portion of the cutting tool; and
    a plurality of curved side panels extending between the first annular member and the second annular member and coupled to the first and second annular members, the curved side panels being arranged about an axis of rotation of the cutting tool to form a hollow, tubular cutting structure and comprising a plurality of cutting teeth oriented in a circumferential direction about the axis of rotation;

wherein each curved side panel of the plurality of curved side panels comprises a first longitudinal edge portion and a second longitudinal edge portion; and wherein the curved side panels overlap such that the first longitudinal edge portion of each of the curved side panels is disposed on the outside of the cutting structure and the second longitudinal edge portion of each of the curved side panels is disposed on the inside of the cutting structure.

12. The cutting tool of claim 11, wherein the second annular member comprises a burr member.

13. The cutting tool of claim 11, wherein:
the cutting teeth of the curved side panels comprise a long dimension and a short dimension; and
the long dimensions of the cutting teeth are oriented longitudinally on a hemispherical surface of the cutting tool.

14. The cutting tool of claim 11, wherein:
the plurality of curved side panels are curved metal side panels; and
the plurality of curved metal side panels are coupled to each other and to the first and second annular members by welding.

15. The cutting tool of claim 11, wherein an interior of the cutting structure is completely hollow.

16. The cutting tool of claim 11, wherein the cutting tool has a constant diameter between the first annular member and the second annular member.

17. The cutting tool of claim 11, wherein the cutting tool tapers between the first annular member and the second annular member.

18. The cutting tool of claim 11, wherein:
the first annular member comprises a plurality of extension portions;
the first annular member and the curved side panels are coupled together at junctions; and
the extension portions of the first annular member overlap the curved side panels at the junctions.

19. The cutting tool of claim 18, wherein the extension portions of the first annular member extend within a hollow interior of the cutting tool.

20. A cutting tool, comprising:
a first annular member at a proximal end portion of the cutting tool, the first annular member comprising a plurality of extension portions extending distally from the first annular member;
a second annular member at a distal end portion of the cutting tool; and
a plurality of curved side panels extending between the first annular member and the second annular member and coupled to the first and second annular members, the curved side panels being arranged about an axis of rotation of the cutting tool to form a hollow, tubular cutting structure and comprising a plurality of cutting teeth oriented in a circumferential direction about the axis of rotation;

wherein the extension portions of the first annular member are received at least partially inside the cutting structure; and the plurality of curved side panels includes a first curved side panel and a second curved side panel, each of the first and second curved side panels comprises a first longitudinal edge portion and a second longitudinal edge portion, and the first and second longitudinal edge portions of the second curved side panel are received within the first curved side panel.

21. A method of making the cutting tool of claim 1, comprising:
forming a plurality of cutting teeth in a plurality of panels;
curving the panels to form the curved side panels;
arranging the curved side panels such that the curved side panels extend between the first annular member and the second annular member, and such that longitudinal edge portions of the curved side panels overlap; and
coupling the panels together to form the cutting structure.

22. A method, comprising cutting bone with the cutting tool of claim 1.

* * * * *